United States Patent
Comsa et al.

(10) Patent No.: US 12,382,400 B2
(45) Date of Patent: Aug. 5, 2025

(54) UPLINK POWER CONTROL

(71) Applicant: InterDigital Patent Holdings, Inc., Wilmington, DE (US)

(72) Inventors: Virgil Comsa, Montreal (CA); Paul Marinier, Brossard (CA); J. Patrick Tooher, Montreal (CA); Tao Deng, Roslyn, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/411,797

(22) Filed: Aug. 25, 2021

(65) Prior Publication Data
US 2021/0385759 A1 Dec. 9, 2021

Related U.S. Application Data

(63) Continuation of application No. 17/005,009, filed on Aug. 27, 2020, now abandoned, which is a (Continued)

(51) Int. Cl.
*H04W 52/14* (2009.01)
*H04B 7/0404* (2017.01)
(Continued)

(52) U.S. Cl.
CPC ........ *H04W 52/146* (2013.01); *H04B 7/0404* (2013.01); *H04B 7/0408* (2013.01);
(Continued)

(58) Field of Classification Search
CPC ............. H04W 52/146; H04W 52/265; H04W 52/281; H04W 52/365; H04W 52/367;
(Continued)

(56) References Cited

U.S. PATENT DOCUMENTS 8,675,602 B2 * 3/2014 Yang .................. H04W 52/146
455/522
10,764,832 B2 9/2020 Comsa et al.
(Continued)

FOREIGN PATENT DOCUMENTS

| CN | 1402914 A | 3/2003 |
| CN | 1437420 A | 8/2003 |

(Continued)

OTHER PUBLICATIONS

Interdigital Communications, Beam-based aspects for New Radio, 3GPP Tdoc R2-165050; 3GPP TSG-RAN WG2 #95; Göteborg, Sweden, Aug. 22-26, 2016, 4 pages.

(Continued)

*Primary Examiner* — Raymond S Dean
(74) *Attorney, Agent, or Firm* — Flaster Greenberg, P.C.

(57) ABSTRACT

Techniques for uplink power control (e.g., for New Radio (NR)) are disclosed. A wireless transmit/receive unit (WTRU) may determine that the WTRU is to perform a first and a second transmissions using a first and a second transmission beams. The WTRU may determine an uplink transmission power for one or more of the first or second transmissions. For example, if the angular separation of the first and the second transmission beams is greater than a first separation threshold, the WTRU may determine the uplink transmission power having a first maximum power level parameter and a second maximum power level parameter. If the angular separation of the first and the second transmission beams is less than a second separation threshold, the WTRU determine the uplink transmission power having a shared maximum power level parameter. The WTRU may transmit the first and second transmissions using the first and second transmission beams, respectively.

14 Claims, 6 Drawing Sheets

Related U.S. Application Data continuation of application No. 16/336,968, filed as application No. PCT/US2017/053360 on Sep. 26, 2017, now Pat. No. 10,764,832.

(60) Provisional application No. 62/500,809, filed on May 3, 2017, provisional application No. 62/474,955, filed on Mar. 22, 2017, provisional application No. 62/401,009, filed on Sep. 28, 2016.

(51) Int. Cl.
  *H04B 7/0408* (2017.01)
  *H04W 52/26* (2009.01)
  *H04W 52/28* (2009.01)
  *H04W 52/36* (2009.01)

(52) U.S. Cl.
  CPC ....... *H04W 52/265* (2013.01); *H04W 52/281* (2013.01); *H04W 52/365* (2013.01); *H04W 52/367* (2013.01)

(58) Field of Classification Search
  CPC ........... H04W 52/00–60; H04B 7/0404; H04B 7/0408
  See application file for complete search history.

(56) References Cited

U.S. PATENT DOCUMENTS

| | | | |
|---|---|---|---|
| 2003/0181163 | A1 | 9/2003 | Ofuji et al. |
| 2003/0195017 | A1 | 10/2003 | Chen et al. |
| 2006/0270434 | A1 | 11/2006 | Pinheiro |
| 2007/0082620 | A1 | 4/2007 | Zhang et al. |
| 2010/0267341 | A1 | 10/2010 | Bergel et al. |
| 2011/0038271 | A1 | 2/2011 | Shin et al. |
| 2011/0081936 | A1 | 4/2011 | Haim et al. |
| 2012/0114128 | A1 | 5/2012 | Derkx |
| 2013/0176953 | A1 | 7/2013 | Stern-Berkowitz et al. |
| 2013/0223251 | A1 | 8/2013 | Li et al. |
| 2013/0324182 | A1 | 12/2013 | Deng et al. |
| 2014/0126530 | A1 | 5/2014 | Siomina et al. |
| 2015/0271798 | A1* | 9/2015 | Chen ..................... H04L 1/1854 370/329 |
| 2015/0296454 | A1* | 10/2015 | Lee .................. H04W 52/0209 370/311 |
| 2015/0373648 | A1* | 12/2015 | Yang ..................... H04W 52/10 455/522 |
| 2016/0066288 | A1* | 3/2016 | Feng ................... H04W 52/243 370/280 |
| 2017/0156140 | A1* | 6/2017 | Islam ..................... H04L 5/0044 |
| 2017/0339609 | A1* | 11/2017 | Youn ..................... H04W 76/11 |
| 2018/0049222 | A1* | 2/2018 | Manolakos ........... H04L 5/0082 |
| 2018/0062808 | A1* | 3/2018 | Lee .................... H04L 25/03343 |
| 2019/0007152 | A1* | 1/2019 | Yi ......................... H04L 5/0028 |
| 2019/0222279 | A1 | 7/2019 | Xi et al. |

FOREIGN PATENT DOCUMENTS

| | | |
|---|---|---|
| CN | 102308640 A | 1/2012 |
| CN | 102405603 A | 4/2012 |
| CN | 103733697 A | 4/2014 |
| CN | 103797865 A | 5/2014 |
| CN | 104350790 A | 2/2015 |
| CN | 104981007 A | 10/2015 |
| KR | 101579705 B1 | 12/2015 |
| WO | WO 2016048231 A1 | 3/2016 |

OTHER PUBLICATIONS

NTT DOCOMO,Study on New Radio (NR) Access Technology, 3GPP Tdoc RP-161214; 3GPP TSG RAN Meeting #72, Busan, Korea., Jun. 13-16, 2016, 8 pages.

LG Electronics,Consideration on UL power control procedure for NR, 3GPP Tdoc R1-166922; 3GPP TSG RAN WG1 Meeting #86; Gothenburg, Sweden, Aug. 22-26, 2016, 3 pages.

ICNIRP Guidelines for Limiting Exposure to Time-Varying Electric, Magnetic and Electromagnetic Fields (up to 300 GHz), International Commission on Non-Ionizing Radiation Protection; Health Physics vol. 74, No. 4, pp. 494-522 (available at http://www.icnirp.org/cms/upload/publications/ICNIRPemfgdl.pdf), 1998, 34 pages.

ZTE, "Remaining issues on UL power control for NB-IoT", 3GPP Tdoc R1-162765, 3GPP TSG RAN WG1 Meeting #84bis, Busan, Korea, Apr. 11-15, 2016, 7 pages.

ASUSTek, UL power control in multi-beam based approaches, 3GPP Tdoc R1-167756; 3GPP TSG RAN WG1 Meeting #86; Gothenburg, Sweden, Aug. 22-26, 2016, 3 pages.

ZTE, "UL power control for NB-IoT", 3GPP Tdoc R1-161873, 3GPP TSG RAN WG1 NB-IoT Ad-Hoc Meeting, Sophia Antipolis, France, Mar. 22-24, 2016, 4 pages.

* cited by examiner

UPLINK POWER CONTROL

CROSS-REFERENCE TO RELATED APPLICATIONS

This application is a continuation application of U.S. application Ser. No. 17/005,009, filed Aug. 27, 2020, which is a continuation application of U.S. application Ser. No. 16/336,968, filed Mar. 27, 2019, which is a national stage application under 35 U.S.C. § 371 of International Application No. PCT/US2017/053360, filed Sep. 26, 2017, which claims the benefit of U.S. Provisional Application Ser. No. 62/401,009 filed Sep. 28, 2016, U.S. Provisional Application Ser. No. 62/474,955 filed Mar. 22, 2017, and U.S. Provisional Application Ser. No. 62/500,809 filed May 3, 2017, the contents of which are incorporated by reference herein in their respective entirety, for all purposes.

BACKGROUND

Mobile communications continue to evolve. A fifth generation may be referred to as 5G, which may implement an advanced wireless communication system called New Radio (NR).

SUMMARY

Systems, methods, and instrumentalities are disclosed for uplink power control, e.g., for New Radio (NR) by a wireless transmit/receive unit (WTRU). A WTRU may determine that the WTRU is to perform a first transmission using a first transmission beam and a second transmission using a second transmission beam. A WTRU may determine an uplink transmission power for one or more of the first or second transmissions.

In examples, a WTRU may determine an angular separation of the first and second transmission beams. For example, a WTRU may determine an angular separation between the first and second transmission beams based on one or more of an angular distance, directional correlation, or spatial separation of the first and second transmission beams. When an angular separation of the first and second transmission beams is greater than a first separation threshold, a WTRU may determine the uplink transmission power based on the first transmission associated with the first transmission beam having a first maximum power level parameter and the second transmission associated with the second transmission beam having a second maximum power level parameter.

When an angular separation of the first and second transmission beams is less than a second separation threshold, a WTRU determine the uplink transmission power based on the first transmission associated with the first transmission beam and the second transmission associated with the second transmission beam having a shared maximum power level parameter. The first separation threshold and the second separation threshold may have a same value.

One or more of the determined first maximum power level parameter, the second maximum power level parameter, or the shared maximum power level parameter may include a configured maximum transmitted power ($P_{CMAX}$), wherein the $P_{CMAX}$ may be based on one or more of a maximum gain or a maximum effective isotropic radiated power (EIRP).

A WTRU may transmit the first transmission using the first transmission beam and the second transmission using the second transmission beam. When the determined uplink transmission power for one or more of the first or second transmissions exceed a maximum allowed power, a WTRU may perform power scaling of one or more of the first or second transmission beams based on a priority order. The priority order for performing the power scaling of one or more of the first or second transmission beams may be based on one or more of a numerology parameter, or property of the first or second transmission beam that may include one or more of a duration, waveform used, or type of transmission.

The determined shared uplink transmission power level parameter may include an EIRP level parameter. A WTRU may determine available power associated with the first transmission beam. When a EIRP threshold value exceeds when the second transmission beam is transmitted with the first transmission beam, a WTRU may perform power allocation on one or more of the first or second transmission beams. When performing the power allocation, a WTRU may, for example, scale one or more of the first or second transmission beams to satisfy the EIRP threshold value associated with the uplink transmission power. Scaling one or more of the first or second transmission beams may be based on one or more of the $P_{CMAX}$, a total power of on-going transmission of the second transmission, or a guaranteed power of the second transmission. When performing the power allocation, a WTRU may, for example, determine a required transmission power of the first and second transmission beams. A WTRU may calculate a normalized required transmission power associated with the required transmission power of the first and second transmission beams. A WTRU may perform the power allocation of the first and second transmission beams based on the calculated normalized required transmission power.

A WTRU may be configured to perform power control for uplink transmissions with multiplexed numerologies, beamforming and related signaling. For example, the WTRU may perform uplink power control based on one or more of the following: power allocation rules, priorities, dependency on numerology, multiplexed numerologies, interference (e.g., victim nodes), beamforming, and/or uplink power control related signaling. Power allocation may be dependent on numerology. Power allocation with multiple numerologies may consider a maximum digital-to-analog converter (DAC) dynamic range and/or a maximum configured power. Power applicable to transmissions may be guaranteed. Power allocation for transmission may use multiple beams with $P_{CMAX}$ configured per direction. Resource selection may be power-aware. Priority rules may be applicable to transmissions using multiple numerologies and/or beams. Power may be allocated based on the presence of unintended receivers (e.g., victim nodes). Power headroom reports may be triggered and/or calculated with multiple numerologies. Power limitations may be signaled with multiplexed numerologies. In certain applications, power sharing may not exceed EIRP requirements (e.g., based on coupling parameters). Uplink power control may use multiple waveforms. Power sharing and/or scaling determination may be used for normalized transmission powers (e.g., to handle scenarios with multiple configured maximum total powers).

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
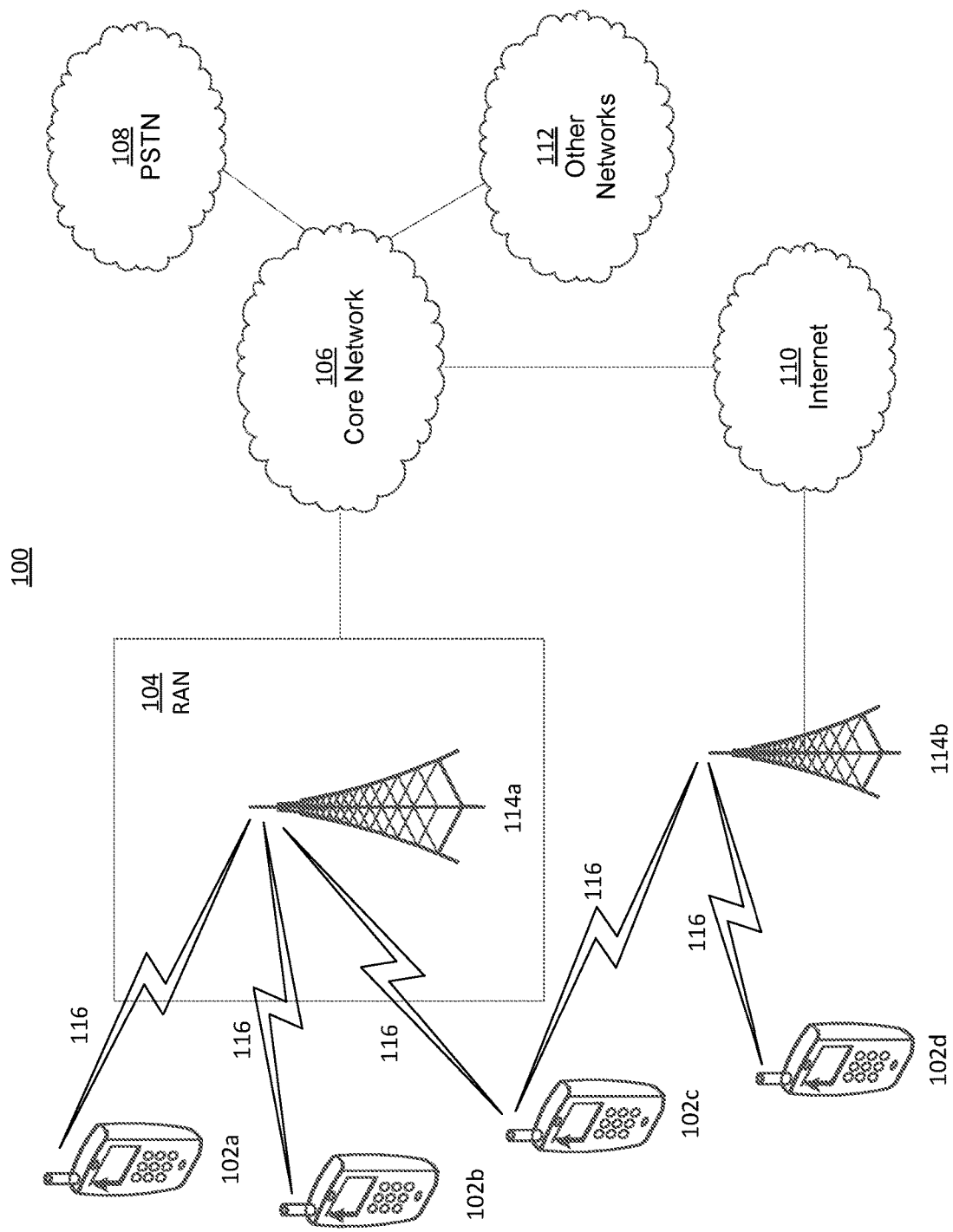
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
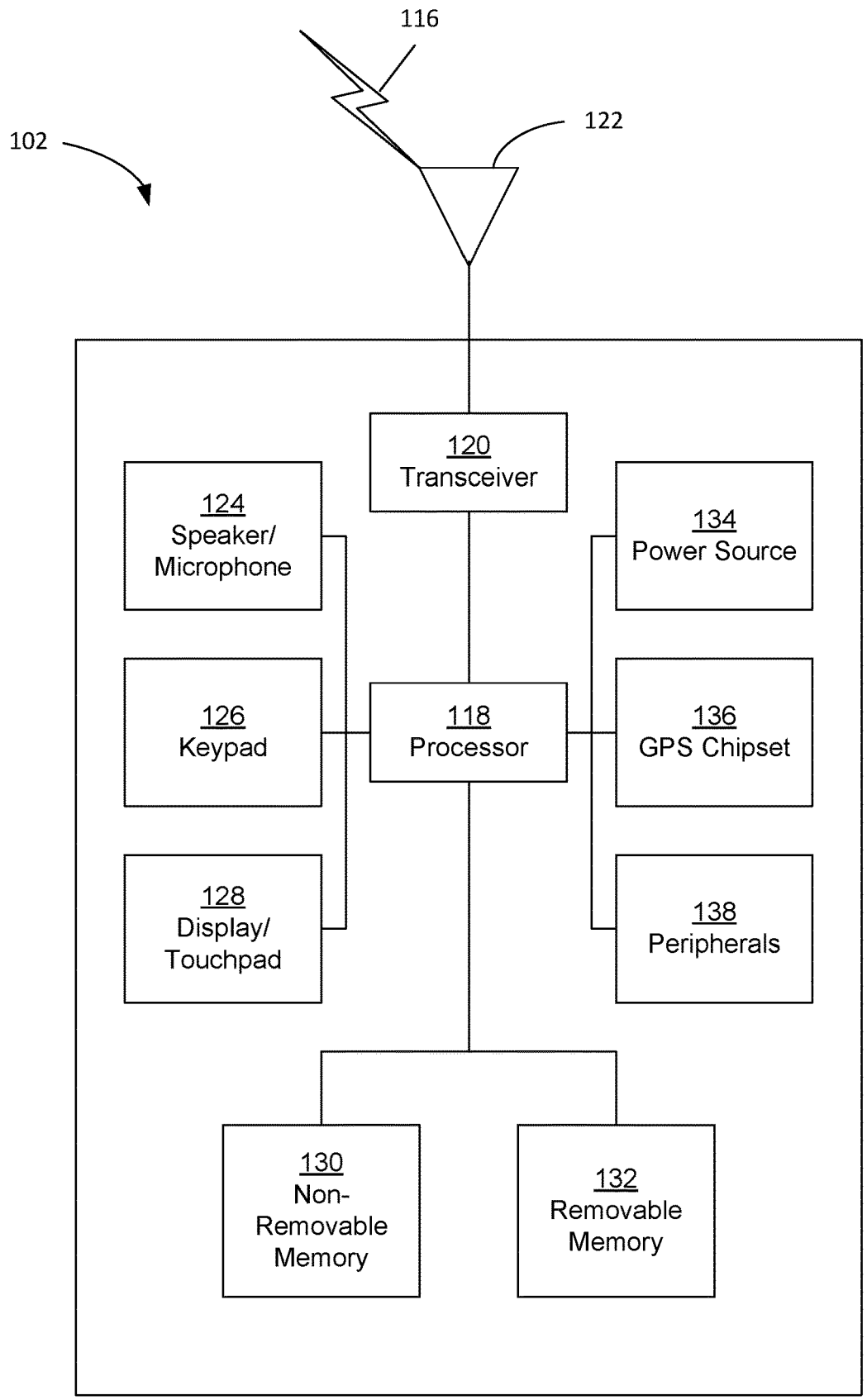
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
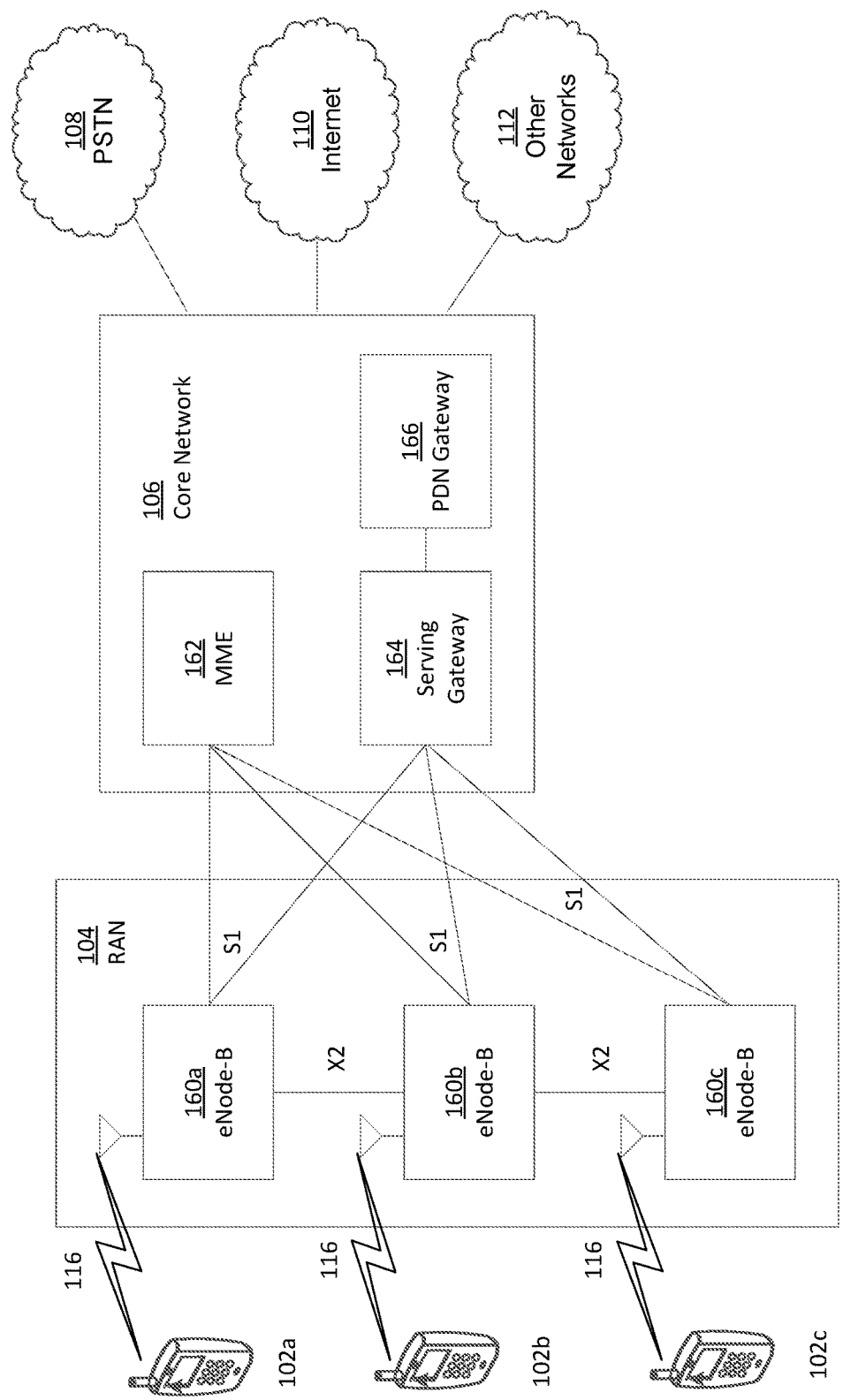
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
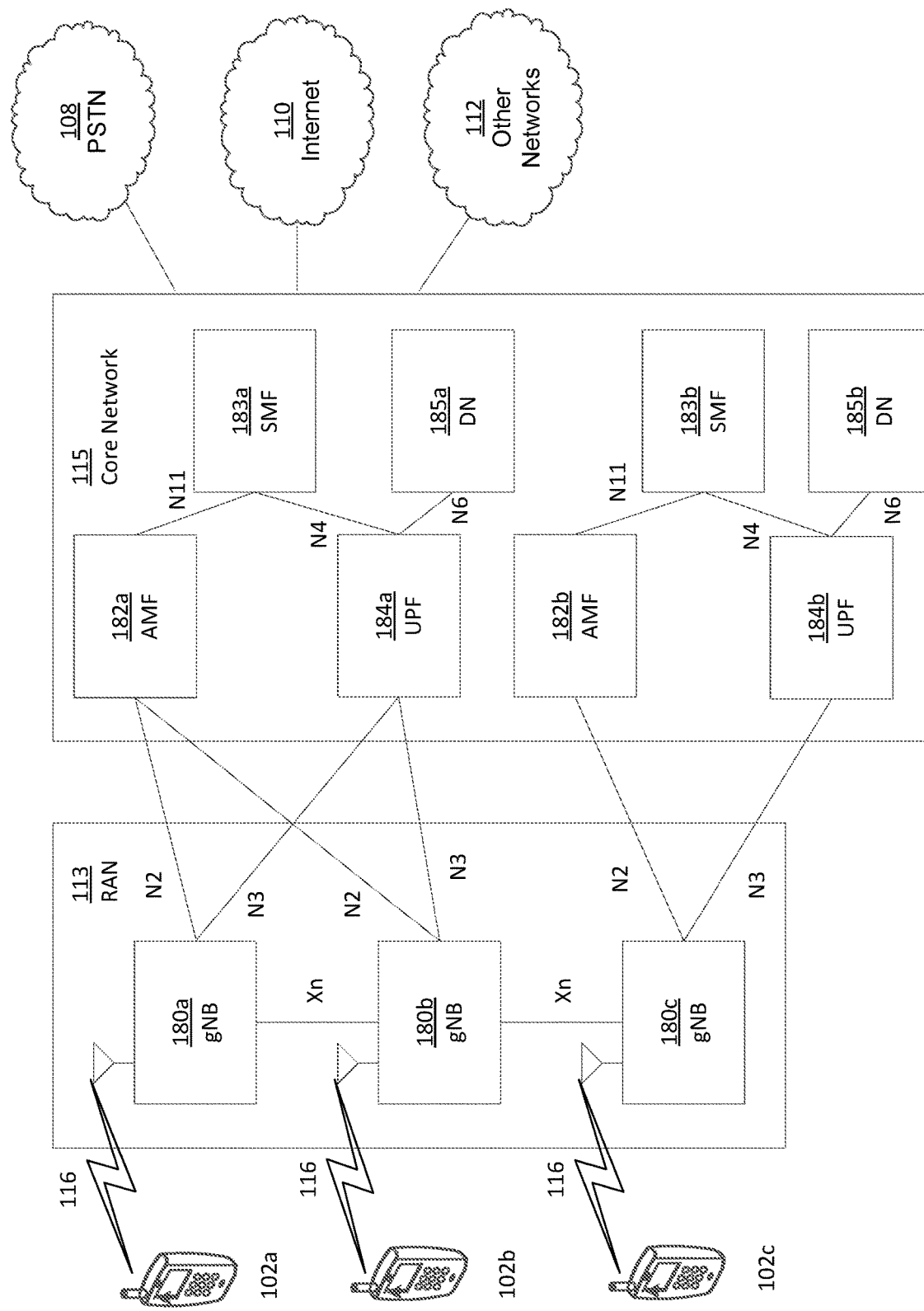
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A next generation of wireless systems is referred to as New Radio (NR). NR access technology may support a number of use cases, such as enhanced Mobile Broadband (eMBB), ultra-high reliability and low latency communications (URLLC), and/or massive machine type communications (mMTC). Each use case may have its own set of requirements of spectral efficiency, low latency, and/or massive connectivity, for example.

A cellular wireless system (e.g., NR) may involve an uplink (UL) power control mechanism for power allocation, uplink link adaptation, and/or interference mitigation, e.g., for coexistence.

NR may support carrier aggregation (CA) and/or dual connectivity (DC). NR (e.g., in a DC configuration) may be implemented as a secondary cell or as aggregated cells in conjunction with a LTE cell or aggregated cells. This scenario may be referred to as non-standalone (NSA) NR operation. NR may be an anchor in DC, which may involve standalone operation (SA).

NR may support operation with more than one subcarrier spacing value. Values may be derived from 15 kHz, for example, by multiplication or division by a power of 2. Such operation may be referred to as scalable numerology.

A WTRU may have a reference numerology in a given NR carrier. For example, a WTRU may have one reference numerology in a given NR carrier. A reference numerology may define the duration for a carrier. For example, a reference numerology may define the duration of a subframe for a carrier.

The duration of a subframe (e.g., in NR) for a reference numerology with subcarrier spacing $(2^m * 15)$ kHz may be $1/2^m$ ms.

NR may support multiplexing numerologies in time and/or frequency within a subframe or across subframes, e.g., from a WTRU perspective.

A slot may have a duration of a number y of OFDM symbols in numerology used for a transmission. An integer number of slots may fit within a (e.g., one) subframe duration, for example, when subcarrier spacing may be larger than or equal to that of reference numerology. A mini-slot may be a transmission shorter than y OFDM symbols.

Use cases for NR UL power control may include, for example, one or more of the following: (i) standalone NR single carrier operation (e.g., with single numerology or multiplexed numerology); (ii) NR carrier aggregation multiplexed numerology (e.g., in the same carrier or in different carriers that may be in the same band or in different bands); and/or (iii) NR in DC with different numerologies.

A WTRU may make a power allocation decision. For example, a WTRU may make a power allocation decision for each transmission time unit. A WTRU may make a power allocation decision that may take into consideration, for example, of one or more of the following factors: (i) pathloss measurements and/or estimation; (ii) UL grant(s) received from the network; (iii) unscheduled or grant-less transmission (e.g., for URLLC transmission); (iv) whether there may be an ongoing transmission on a configured carrier or numerology for a corresponding transmission time unit; (v) how a WTRU may make resource selections based on available power; (vi) beamforming related information; and/or (vii) whether there may be different types of concurrent transmissions that may be served simultaneously. Concurrent transmissions may lead to one or more determinations (e.g., by a WTRU) about prioritization in power allocation, for example, for different cases on each carrier, across carriers, across multiplexed numerologies, and/or across services (e.g., URLLC and/or eMBB).

Power allocation may be determined for a SA NR single carrier mode. For example, power allocation may be determined for a SA NR single carrier mode with single or multiplexed numerologies in frequency and/or time domain. One or more numerologies multiplexed in a carrier (e.g., single carrier) in a frequency division multiplexing (FDM) or time division multiplexing (TDM) mode may have different requirements (e.g., eMBB versus URLLC).

Power allocations may be determined for SA NR carrier aggregation (CA) or DC that may be generic for numerologies, multiplexed numerologies and specific.

One or more rules and/or triggers may be defined for power control related signaling (e.g., power headroom report) or power limited signaling.

One or more examples as described herein may be presented in the context of a 5G wireless system (e.g., NR). Subject matter discussed herein may be presented as an example and may be applicable to other systems. Subject matter may be used in any part or whole, separately or in combination and in any order or reordering in a wide variety of implementations (e.g., to other systems).

Power allocation may be dependent on numerology and/or one or more waveforms. In examples, power allocation for a transmission may be adjusted to be proportional to a subcarrier spacing value or waveform used for the transmission. This may be realized, for example, by introducing a term such as $10 \log_{10} (N_{i,c})$ in a power allocation formula. $N_{i,c}$ may be a ratio between a subcarrier carrier spacing (SCS) value that may be used for a transmission (e.g., $SCS_{i,c}$) and a reference subcarrier spacing (e.g., $SCS_{ref}$). Reference subcarrier spacing may be, for example, 15 kHz. This example approach may provide a power spectrum density at a receiver that may remain constant over possible subcarrier spacing values for a given number of physical resource blocks. In examples, power allocation may be given by Eq. 1:

$$P_{x,i,c}(q) = \min\begin{cases} P_{CMAX,i,c}(q), \\ 10\log_{10}(M_{x,i,c}(q)) + 10\log_{10}(N_{i,c}) + P_{O\_x\_ic}(q) + \alpha_{i,c} \cdot PL_{i,c} + \Delta_{TF,i,c}(q) + f_{i,c}(q) \end{cases} \quad \text{Eq. 1}$$

Index 'x' may refer to a type of transmission (e.g., uplink physical channel such as physical uplink shared channel (PUSCH), uplink sounding signal such as sound reference signal (SRS), or uplink demodulation reference signal such as DM-RS. Index 'i' may refer to a block of resources using the same numerology (e.g., a numerology block) or a spectrum operating mode (SOM). Index 'c' may refer to a cell, hypercell, or a carrier. Index 'q' may refer to a specific time interval such as a subframe, slot, or mini-slot.

An offset value may depend on the waveform and/or subcarrier spacing, which may achieve an adjustment in power allocation.

Parameter $P_{CMAX,i,c}(q)$ may refer to a configured maximum transmission power in cell c for numerology block i in time interval q. In examples, parameter $P_{CMAX,i,c}(q)$ may be dependent on a beam direction, beam process, and/or a waveform.

Parameters $P_{O\_x\_i,c}(q)$, $\alpha_{i,c}$, and/or $\Delta_{TFi,c}(q)$ may be configured by higher layers, for example, for each cell c, each numerology block i and/or for each waveform, and/or for each type of transmission x. One or more parameters, described herein, may be interpreted, for example, similar to LTE.

Parameter $f_{i,c}(q)$ may correspond to a transmit power control command that may be received from downlink control information applicable to a transmission. In examples, parameter $f_{i,c}(q)$ may be similar or identical for one or more (e.g., all) numerology blocks i. In examples, parameter $f_{i,c}(q)$ may be applicable (e.g., only applicable) for some numerology blocks i and/or some waveforms.

Parameter $PL_{i,c}$ may correspond to a path loss estimate associated with a cell and/or a numerology block, which may be based on measurements taken on a reference signal and/or based on an assumed transmission power (e.g., cell- and/or numerology-block-specific) that may be configured by higher layers. The WTRU may be configured to determine the resources used for an applicable reference signal. For example, resources for an applicable reference signal may be provided to the WTRU semi-statically (e.g., via a configuration). For example, resources for an applicable reference signal may be provided dynamically (e.g., via downlink control information).

In examples, power allocation for a transmission may be a function of a frequency allocation of a transmission that may be expressed as a number $M_{ref}$ of physical resource blocks of a reference subcarrier spacing, such as 15 kHz. For example, a transmission using a subcarrier spacing of 60 kHz may have a frequency allocation of M physical resource blocks for a subcarrier spacing of 60 kHz. This may be equivalent to a frequency allocation of $M_{ref}$=(60/15) M=4 M in reference numerology. In examples, power allocation (e.g., using an example approach described herein) may be given by Eq. 2:

Power allocation may depend on waveform. A WTRU may be configured to transmit using one or more of multiple waveforms (e.g., cyclic prefix-orthogonal frequency-division multiplexing (CP-OFDM), and/or SC-FDMA). The WTRU may be indicated to use a waveform for an UL transmission using one or more of the following: an indication in an UL grant (e.g., the indication of waveform type may be included in the UL grant); and/or a semi-static configuration.

The WTRU may select a waveform type by using one or more of the following: (i) control channel type used for UL grant (e.g., some parameters of a control channel (e.g., frequency location, numerology, and/or beam) used for granting UL resources may be tied to specific waveforms); (ii) search space tied to waveforms; (iii) a type of UL transmission (e.g., a scheduled UL transmission may use a first waveform, and a non-scheduled (e.g., grant-free) UL transmission may use a second waveform, and/or a contiguous allocation may use a first waveform, whereas a non-contiguous allocation may use a second waveform); (iv) a service type (e.g., URLLC transmission may use a different waveform than eMBB); (v) a retransmission number (e.g., a first transmission may use a first waveform, whereas a retransmission may use a second waveform); (vi) a beam process ID; and/or (vii) a physical channel (e.g., a PUSCH may use a first waveform, and a long physical uplink control channel (PUCCH) (e.g., a PUCCH spanning multiple symbols) may use a second waveform, and a short PUCCH (e.g., a PUCCH using one or two symbols) may use a third waveform).

A WTRU may determine that the WTRU may change waveforms used for UL transmission. The triggers used for changing waveform type may include selection of a waveform type as described herein and/or one or more of the following: (i) channel characteristics (e.g., the pathloss value may be used by the WTRU to determine the waveform to be used); and/or (ii) determination based on available power for each waveform type.

A WTRU may indicate to the network that the WTRU has determined that it may change the waveform using one or more of the following: (i) by transmitting a power headroom report (PHR) report for one or more waveform types as described herein; (ii) by transmitting a buffer status (e.g., indicating that a WTRU may have little remaining data in its buffer and may tolerate latencies associated with waveforms having larger coding gain (e.g., smaller transport block sizes) due to power limitations); and/or (iii) by a feedback report that may include a preferred waveform type (e.g., including measurements (e.g., channel characteristics) to enable the network to determine an optimal waveform).

A WTRU may transmit using multiple waveforms. For example, a WTRU may transmit using multiple waveforms simultaneously. The power control parameters as discussed $$P_{x,i,c}(q) = \min\begin{cases} P_{CMAX,i,c}(q), \\ 10\log_{10}(M_{Ref,x,ic}(q)) + P_{O\_x\_ic}(q) + \alpha_{i,c} \cdot PL_{i,c} + \Delta_{TFi,c}(q) + f_{i,c}(q) \end{cases} \quad \text{Eq. 2}$$

herein may be applicable per group of transmissions and/or categorized by waveform used. For example, one or more (e.g., all) transmissions using SC-FDMA type may be governed by one or more power control formulas using a first set of parameters, and one or more (e.g., all) transmissions using CP-OFDM may be governed by one or more power control formulas using a second set of parameters. The parameters used for each waveform may be specific to the case of multiple simultaneous waveform transmissions.

The parameter $P_{CMAX,i,c}(q)$ may refer to the configured maximum transmission power in cell c for numerology block i in time interval q and may depend on a waveform used. The parameters (e.g., $P_{CMAX,i,c}(q)$, waveform specific offset, and/or compensation coefficient $\alpha_{i,c}$) for each waveform may depend on whether there are simultaneous transmissions using multiple waveforms. The parameters may depend on the relative size of each waveform's total allocation. For example, the $P_{CMAX,i,c}(q)$ values used for simultaneous transmissions of a first and second waveform may be based on the assumption of same sized allocation. Any divergence from that may lead to scaling the $P_{CMAX,i,c}(q)$ values used for transmissions of each waveform (e.g., scaled up for a larger relative allocation and scaled down for a smaller relative allocation). For example, the scaling may be a function of the relative allocations and/or the absolute allocations of each waveform type.

A waveform may use non-contiguous transmissions (e.g., transmissions over blocks of non-adjacent physical resource blocks (PRBs)). A block of contiguous PRBs may have a (e.g., specific) set of parameters (e.g., $P_{CMAX,i,c}(q)$, waveform specific offset, and/or compensation coefficient $\alpha_{i,c}$ values). The appropriate parameters to use may depend on the location of the block within the over-all user and/or carrier spectrum. The parameter values may depend on the number and/or location of simultaneous non-contiguous blocks (e.g., of the same or different waveform). For example, a first set of parameters may be used per-block (e.g., under the assumption that n non-contiguous blocks are transmitted). A second set of parameters per-block may be used to determine the power of the (e.g., remaining) n-x non-contiguous blocks to be transmitted (e.g., if a priority rule determines that x blocks are to be dropped).

The transmit power control (TPC) command (e.g., $f_{i,c}(q)$ in the power control formula described herein) may be waveform specific. A WTRU may maintain one or more loops, e.g., one per waveform and/or beam. A TPC command may be used to indicate (e.g., dynamically indicate) a switch of waveforms. Waveforms may enable higher transmission power. For example, when a WTRU receives a TPC command that pushes the WTRU beyond the transmit power capabilities of a first waveform, the WTRU may use a second waveform that has remaining power available. The WTRU may indicate to the network that it has switched or that the WTRU will switch to a different waveform type.

The power control loop may be maintained over the use of one or more different waveforms. A TPC command leading to a waveform switch may reset some values of the closed-loop power control. For example, the accumulated TPC command may lead to an increase (e.g., continuous increase) in transmission power (e.g., until the waveform is switched dynamically and the transmission power is reset to a lower value). TPC commands (e.g., future commands) may act on the new reset value and/or new waveform type.

Power allocation with multiple numerologies may consider a maximum DAC dynamic range and/or maximum configured power. In examples, a transmission may use resources of one or more numerology block i during a time interval q. This may be realized, for example, using a (e.g., single) RF chain (e.g., as shown in an example illustrated in FIG. 2) or using more than one RF chain.

Power allocated to a (e.g., each) numerology block may be adjusted, for example, through multiplicative factors (e.g., g1 and/or g2) in baseband and/or additional or alternative multiplicative factors in RF. In examples, multiplicative factors may be a function of subcarrier spacing of a corresponding block. For example, g1 and g2 may be proportional to subcarrier spacing used for first and second numerology blocks and may be inversely proportional to N1 and N2, respectively. This example may implement a power dependency factor on numerology, e.g., as described herein.

Factors g1 and g2 may be set independently within a dynamic range constraint of a digital-to-analog converter (DAC). This example may allow for numerology-block-dependent setting of other parameters and may estimate parameters, such as $P_{0\_x\_i,c}(q)$, $\alpha_{i,c}$, or $PL_{i,c}$, when receiving nodes for different numerology blocks may not be the same or when a level of interference may be different between different blocks.

Figure 2:
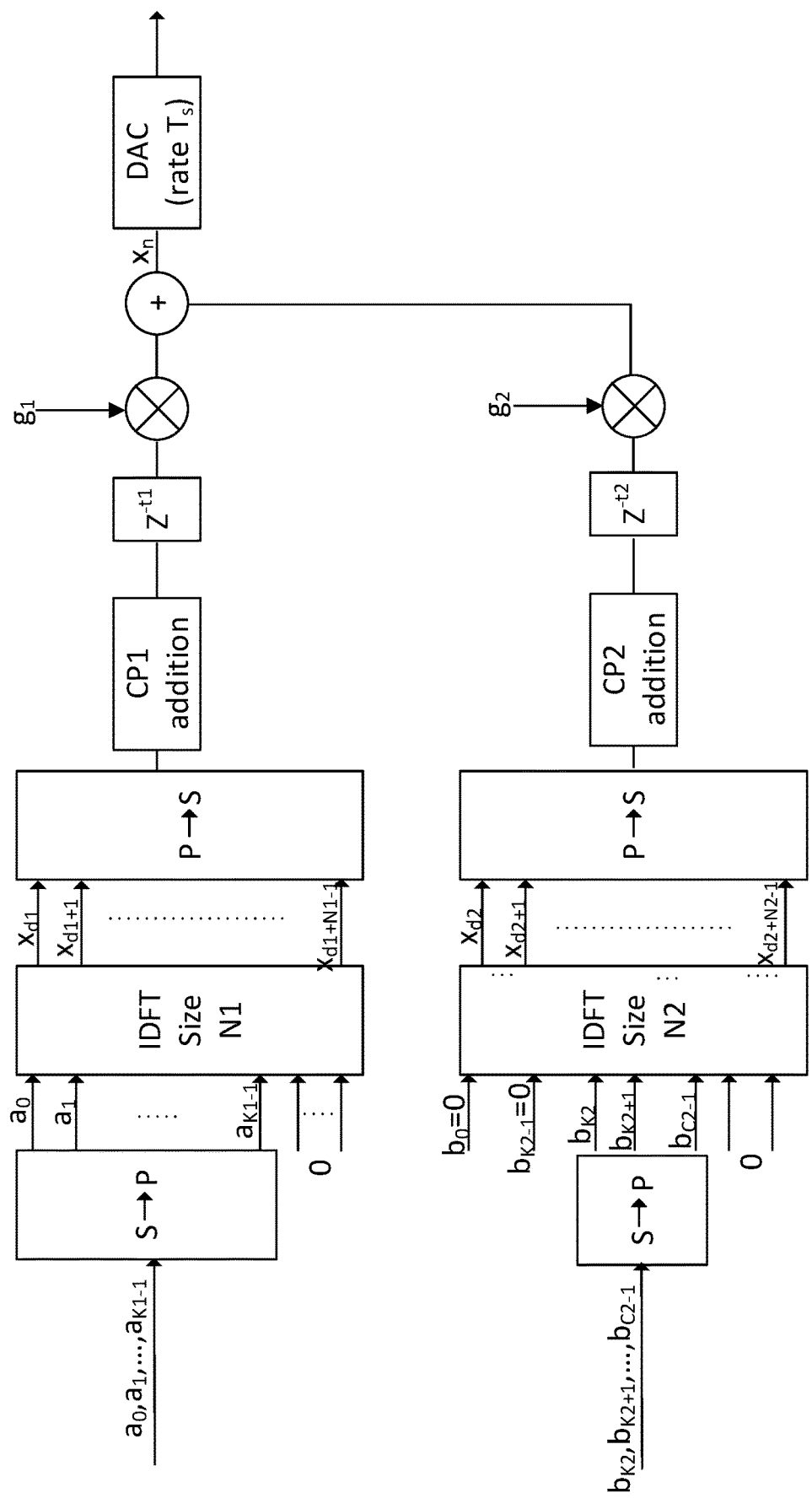
FIG. 2 illustrates an example of transmission over multiple numerology blocks using a radio frequency (RF) chain.

FIG. 2 illustrates an example of transmission over multiple numerology blocks using a RF chain.

A power may be determined for a numerology block, for example, using a formula as described herein, for each block (e.g., for each numerology block). Power may be allocated, for example, when a transmission using multiple numerology blocks may use a RF chain (e.g., single RF chain). Power allocation for a (e.g., each) numerology block may be set differently from a required power per block. For example, power allocation for a numerology block may be set differently from a required power per block because of a dynamic range constraint of a DAC. A range constraint may impose a maximum ratio R between the powers of two numerology blocks. A ratio of required power per block may exceed R for a pair of blocks. In examples, power allocated to a block with the smallest required power may be raised to $P_{x,i}/R$. $P_{x,i'}$ may be a required power of a block with the largest required power. Power allocated to a block with the largest required power may be set to this required power.

Power allocated to a transmission using multiple numerology blocks (e.g., in linear units) may be a function of the sum of the powers required for each numerology block.

In examples, power allocation may be expressed according to Eq. 3:

$$P_{x,c}(q) = \min\left\{ \begin{array}{l} P_{CMAX,c}(q), \\ 10\log_{10}\left(\sum_{i=1}^{m} 10^{P_{x,i,c}(q)/10}\right) \end{array} \right\} \quad \text{Eq. 3}$$

The number of numerology blocks may be denoted as m. The same or similar procedure may apply, for example, when there may be m simultaneous transmissions during a timer interval q, where each transmission may use a specific numerology block.

A configured maximum transmission power, $P_{CMAX,c}(q)$, may be applicable to the sum of transmissions over one or more (e.g., all) numerology blocks of cell c. Such a parameter may be determined by a maximum power reduction (MPR), which may be a function of frequency allocations on each numerology block. For example, an applicable maximum power reduction may depend on a difference in frequency between frequency allocations of a pair of numerology blocks.

In examples, transmission powers over one or more (e.g., all) numerology blocks may be scaled down by the same factor such that $P_{CMAX,c}(q)$ may not be exceeded, for example, when the sum of transmission powers over the m numerology may exceed $P_{CMAX,c}(q)$. For example, transmission powers over one or more numerology blocks may be scaled down by the same factor for a (e.g., single) transmission using resources of multiple numerology blocks. Transmission power may be scaled down by different factors, for example, depending on the numerology block. For example, transmission power may be scaled down by different factors for multiple simultaneous transmissions. Scaling may be applied to certain numerology blocks, for example, according to one or more priority rules depending on a property of the numerology block (e.g., subcarrier spacing value or symbol duration) and/or a property of the transmission using the numerology block.

Power allocation may be used with an EIRP limitation. A WTRU may perform simultaneous transmissions using one or more beam b (e.g., or precoder). A (e.g., each) beam may be associated with a beam process and/or beam pair link. A (e.g., each) beam may be associated to a separate RF chain to allow for separate transmissions.

A WTRU may have an (e.g., maximum) effective isotropic radiated power (EIRP). For example, a WTRU may have a maximum EIRP to comply with a regulatory requirement. A WTRU may impose a (e.g., maximum) total radiated power (TRP). The WTRU allocating power to different transmissions while complying with the requirement may be described herein.

Power scaling principles may be used. To comply with a requirement of maximum EIRP, the WTRU may ensure that the EIRP over any direction with respect to the WTRU does not exceed the maximum EIRP ($EIRP_{max}$). A direction may (e.g., typically) be defined in terms of elevation (theta) and azimuth (phi) in a spherical coordinate system centered at the WTRU location with a plane of reference tied to the WTRU physical geometry. To simplify notation in one or more examples described herein, a pair of spherical coordinates (theta, phi) may be represented using a symbol d.

For a transmission t over a directional antenna system (e.g., such as an array or panel), the EIRP in a specific direction d may be expressed as the product of a conducted power $P_t$ and of a gain function $G_{b(t)}(d)$, where b(t) may be an index representing one of a set of possible beams (e.g., or radiation patterns) that may be synthesized for transmission t. With a set of simultaneous transmissions over a time interval q, the requirement may be expressed as:

$$\max_d \sum_t P_t(q) G_{b(t)}(d) \leq EIRP_{max}(q)$$

The WTRU may comply with a requirement of maximum TRP ($TRP_{max}$), where TRP may sum up power radiated over one or more (e.g., all) directions. The $TRP_{max}$ requirement may be expressed as:

$$\sum_t P_t(q) G_t \leq TRP_{max}$$

$G_t$ may be a parameter dependent on the antenna system and RF chain used for the transmission. Such parameter may be assumed to be known based on calibration and testing procedures. The conducted power $P_t(q)$ may be calibrated such that $G_t=1$, for example. If the conducted power $P_t(q)$ is calibrated to $G_t=1$, the requirement may be similar to a maximum total transmission power, $P_{CMAX}$, where $P_{CMAX}$ may be an upper bounded by $TRP_{max}$.

If a set of conducted powers $P_t(q)$ is calculated based on other power control methods and if either $EIRP_{max}$ or $TRP_{max}$ would be exceeded in a time interval q, the WTRU may scale transmission(s) such that the following conditions are satisfied:

$$\max_d \sum_t w_t(i) \cdot P_t(q) G_{b(t)}(d) \leq EIRP_{max}(q)$$

and $$\sum_t w_t(i) \cdot P_t(q) \leq P_{CMAX}(q)$$

where $w_t(i)$ may be scaling factors between 0 and 1.

A WTRU may estimate the total EIRP in a particular direction d if the WTRU has a knowledge of the gain function $G_{b(t)}(d)$ of each transmission for a transmission d (e.g., every transmission d). The gain function for a given direction may be estimated based on knowledge of the antenna system geometry and the weights applied to each antenna element. A WTRU may store gain functions for a pre-determined set of directions and a pre-determined set of possible beams. Gain functions may have been obtained from measurements or testing.

EIRP estimation and scaling using coupling parameters may be used. To determine whether scaling is needed due to EIRP, the WTRU may determine: $\Sigma_t P_t(q) G_{b(t)}(d)$ for a subset of directions d for which EIRP is more likely to be maximum. For example, the WTRU may estimate a value of EIRP for each transmission t, for the direction for which $G_{b(t)}(d)$ is maximized. The maximum value may be referred to as $G_b^{max}$, and the corresponding direction may be referred to as $Db^{max}$. To estimate EIRP in that direction, the WTRU may add the contributions of other beams b' for which the gain may not be maximized at $Db^{max}$. The total EIRP in the direction for which the gain of beam b is maximized may be determined as:

$$EIRP_{b(t),max}^{tot} = G_{b(t)}^{max}\left(P_t(q) + \sum_{t' \neq t} C_{b(t)b'(t')} P_{t'}(q)\right)$$

where $C_{b,b'}$ may be the ratio between the gain of beam b' and the gain of beam b for the direction at which the gain of beam b may be maximum:

$$C_{b,b'} \equiv \frac{G_{b'}(D_b^{max})}{G_b^{max}}$$

This ratio may be referred to as the coupling parameter for the pair of beams (b, b') (e.g., ordered pair of beams (b, b')). A WTRU may determine a value of $EIRP_{b(t),max}^{tot}$ for each transmission t and may perform scaling. A WTRU may perform scaling such that $EIRP_{b(t),max}^{tot}$ may not exceed $EIRP_{max}$ for any t. Coupling parameters may not be assumed to be symmetrical. For example, $C_{b,b'}$ may be different from $C_{b',b}$. The same value may be used (e.g., to simplify calculations and/or reduce signaling overhead) for $C_{b,b}'$ and $C_{b',b}$ (e.g., by using the maximum value between $C_{b,b}'$ and $C_{b',b}$ as defined herein).

Determination of coupling parameters may be used.

The coupling parameters may be obtained. For example, the coupling parameters may be obtained when EIRP is estimated using one or more of EIRP estimation approaches described herein. The coupling parameters may be obtained using one or more of the approaches described herein.

A WTRU-based estimation of coupling parameters with signaling to network may be used.

Coupling parameters may be calculated and/or stored by the WTRU based on the knowledge of the gain functions (e.g., of each possible beam that may be generated). Calculating and/or storing coupling parameters by the WTRU based on the knowledge of the gain functions may be used when the number of possible beams is not very large, or for certain implementations such as grid of beams (GoB). The coupling parameters may be stored based on measurements.

A WTRU may provide information (e.g., to assist network scheduling) related to coupling parameters according to one or more of the following: (i) PHR triggered by change of $P_{CMAX}$ per beam; (ii) reporting of coupling parameters; and/or (iii) network-based estimation of coupling parameters.

A PHR triggered by change of $P_{CMAX}$ per beam may be used. A WTRU may provide power headroom (PH) information pertaining to a transmission over a beam (e.g., or beam process) that may be based on one or more coupling parameters with beams used for transmissions over other beams (e.g., or beam processes). The WTRU may calculate a PH for a transmission over a first beam (e.g., assuming that the WTRU would be simultaneously transmitting over a second beam using the conducted power (and/or pattern) last used for the second beam). The PH for a beam in a time interval q may be defined as the difference (e.g., in dB units) between a configured maximum transmission power applicable to the beam $P_{CMAX,b}(q)$ and the required transmission power using the beam in the time interval. The value of $P_{CMAX,b}(q)$ may be dependent on the gain functions of the beams used, as described herein. A PHR may be triggered at least when the value of $P_{CMAX,b}(q)$ changes since the last report transmission. For example, a PHR may be triggered at least when the absolute difference value of $P_{CMAX,b}(q)$ changes higher than a threshold since the last report transmission.

Reporting of coupling parameters may be used. A WTRU may (e.g., directly) provide the value of at least one coupling parameter applicable to a pair of beams.

For example, the WTRU may transmit one or more coupling parameters pertaining to beams currently used or configured (e.g., for each beam process or beam pair link). The one or more coupling parameter information may be provided in media access control (MAC) layer signaling. The one or more coupling parameter information may be provided in MAC layer along with or as part of a power headroom (PH) report. The report may be triggered based on changes in the value of one or more of the coupling parameters. For example, a report may be triggered if the value of one or more coupling parameters changes by more than a threshold, or becomes higher (or lower) than a threshold. The threshold may be pre-defined or configured by a higher layer. The information (e.g., coupling parameters pertaining to beams currently used or configured) may be provided as physical layer signaling (e.g., uplink control information). For example, coupling information may be quantized to a few bits, or a single bit. Coupling information may be transmitted periodically or upon following reception of downlink control information. The transmitted coupling information may indicate an uplink grant or may indicate a trigger for the transmission of coupling information.

A WTRU may provide a set of coupling parameters between (e.g., all or a subset of) possible pairs of beams that may be generated by an (e.g., each) antenna system. The set of coupling parameter information may be provided by higher layer signaling, for example as part of capability information along with other antenna related information. The network may be informed of and/or may control the identities of the beams in use for each beam process or beam pair link. For example, upon a change of beam for one or more beam processes, the WTRU may provide the identity of the new beam and/or the identity of the beam that most closely matches the pattern of the new beam.

Network-based estimation of coupling parameters may be used. The coupling parameters may be obtained from signaling from the network, such as a physical layer, MAC, and/or radio resource control (RRC) layer signaling. For example, the coupling parameters applicable to transmission t may be provided as part of the corresponding grant. The coupling parameters may be measured at the transmit/receive point (TRP) network. For example, the coupling parameters may be measured at the TRP network based on the assumption that most of the energy received at the TRP for beam b may be contributed by the main lobe of beam b. Using the same beam at the TRP, the ratio between received power from a signal transmitted using beam b and received power from a signal transmitted using beam b' may provide an estimate of $C_{b,b}'$. The WTRU may transmit a sounding signal using each beam. For example, the WTRU may transmit a sounding signal using each beam upon reception of a trigger from physical layer or higher layer signaling.

Dual connectivity power allocation with an EIRP requirement may be used. A WTRU may be configured with two MAC instances (or cell groups), e.g., in a NR-LTE, LTE-LTE, or NR-NR dual connectivity scenario. The WTRU may calculate the power allocation of transmissions of one or more cell groups based on EIRP requirements according to one of the following. A WTRU may determine a power available to a first cell group (e.g., in terms of conducted power) by determining a tentative power allocation of the first cell group using power allocation with two cell groups, for example using power control mode 1 or mode 2. A guaranteed power available to each cell group may be considered. The WTRU may determine if the EIRP requirement would be satisfied when transmissions from the second cell group are taken into account. If the EIRP requirement would not be satisfied with the tentative power allocation, the WTRU may determine an actual power allocation for the cell group that may be lower than the tentative power allocation such that the EIRP requirement may be met.

A WTRU may be configured to use power allocation where a power allocation of a first cell group may be determined based on one or more of the following: the configured maximum total power $P_{CMAX}$, the total power of on-going transmissions of a second cell group, and/or the guaranteed power of a second cell group. A WTRU may determine a tentative power allocation for a first cell group $P_{CG1,t}$ using a procedure for the determination of the power allocation of a cell group with power control mode 2. The WTRU may determine if $EIRP_{max}$ would be exceeded (e.g., using one of the procedures described herein) for the portion that overlaps with the on-going transmissions of CG2 and for the portion that overlaps with the subsequent transmissions of CG2 as described herein.

For the portion that overlaps with the on-going transmissions of CG2, the WTRU may scale transmissions of CG1 using factors $w_{t'}(i)$ such that the following condition may be satisfied for any direction d:

$$\sum_{t \in CG2} P_t(q) G_{b(t)}(d) + \sum_{t \in CG1} w_t'(i) \cdot (q) G_{b(t)}(d) \le EIRP_{max}(q)$$

For the portion that overlaps with the subsequent transmissions of CG2, the WTRU may not be aware of the power requirements of such transmissions at the time of making the determination. A WTRU may determine or assume that CG2 would use up to its guaranteed power PCG2 and that such guaranteed power may be used by a transmission (e.g., single transmission) over a beam (e.g., single beam). The WTRU may scale transmissions of CG1 using wt"(i) such that the following condition is satisfied for any direction d for any beam b(t') that may be configured to be used for a transmission of CG2.

$$\min[P_{CG2} G_{b(t')}(d), EIRP_{max}(q)] + \sum_{t \in CG1} w_t''(i) \cdot P_t(q) G_{b(t)}(d) \le EIRP_{max}(q)$$

The WTRU may determine or assume that CG2 would use up to its guaranteed power but that such guaranteed power would be shared in a specific way among transmissions of CG2 (e.g., based on the latest transmission from CG2 or on an equal basis). The WTRU may perform scaling according to the same principles as described herein (e.g., based on coupling parameters).

For each transmission t of CG1, the WTRU may determine its scaling factor as the minimum between wt'(i) and wt"(i).

Power allocation for transmission may use multiple beams with $P_{CMAX}$ configured per direction. For example, a WTRU may be configured to perform a first transmission using a first transmission beam and a second transmission using a second transmission beam.

Figure 4:
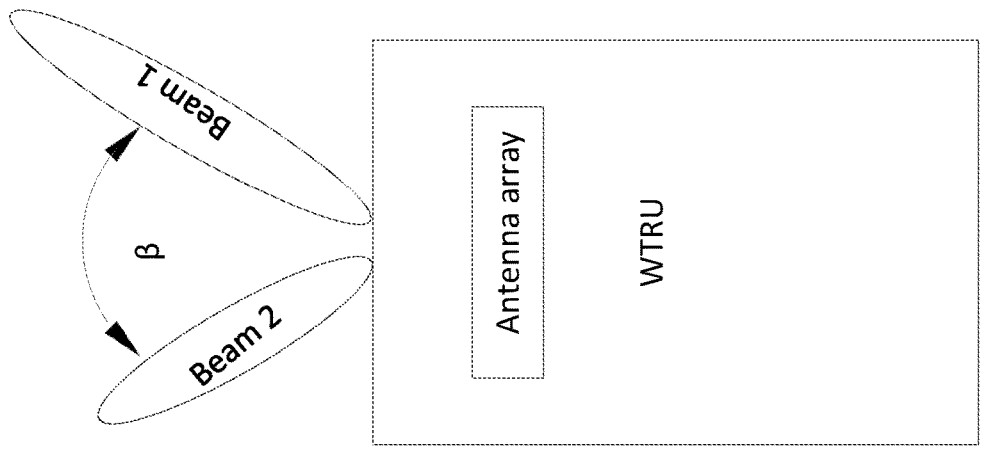
FIG. 4 illustrates an example of beams in the same subset.
Figure 3:
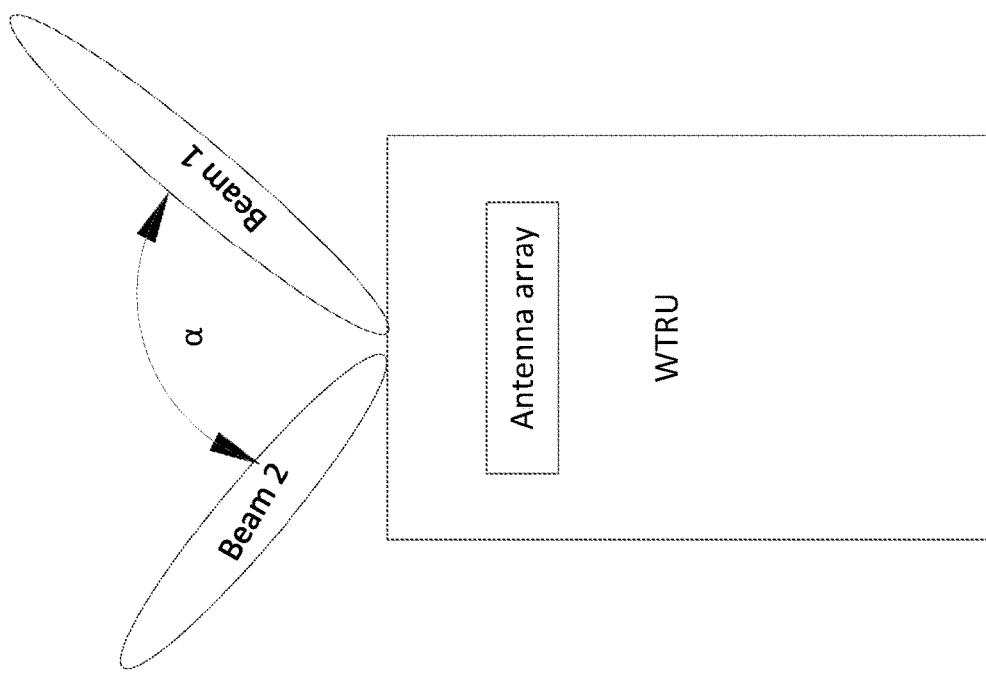
FIG. 3 illustrates an example of beams in different subsets.

A WTRU may use (e.g., to comply with EIRP) coupling parameters that take the value 0 or 1 depending on the angular separation between the main lobes of the beams illustrated FIGS. 3 and 4 respectively, where alpha and beta may represent separation between beam 1 and beam 2 in angular domain, and theta may be an angular threshold. As shown in FIG. 3, alpha may be larger than the threshold (e.g., theta). As shown in FIG. 4, beta may be smaller than the angular threshold (e.g., theta). The angular separation between the beams may be based on one or more of an angular distance, directional correlation, and/or spatial separation of the first and second transmission beam.

A WTRU may determine/configure an uplink transmission power (e.g., maximum transmission power) for one or more of the first or second transmissions. For example, a configured maximum transmission power $P_{CMAX,d}(q)$ may be defined and be applicable on a per beam (or direction) basis. For example, the total power of multiple beams may exceed a threshold if the beams are separated by more than a first separation threshold (e.g., theta) in spatial (or angular) domain. If the angular separation of the first and second transmission beams is greater than the first separation threshold, the uplink transmission power may be determined. For example, the uplink transmission power may be determined based on the first transmission and the second transmission. The first transmission may be associated with the first transmission beam having a first maximum power level parameter. The second transmission may be associated with the second transmission beam having a second maximum power level parameter. If a system uses an analog beam capable antenna system (e.g., having fixed angular separation), angular separation of the beams may be configured based on the location/position of the antenna in the system. The configured maximum transmission power per direction may be defined in terms of conducted power (e.g., first and second maximum power level parameter). For example, the configured maximum transmission power per direction may be determined based on $EIRP_{max}(q)$ and/or the maximum gain $Gb^{max}$ over one or more (e.g., all) possible beams that may be synthesized by the WTRU, e.g., $P_{CMAX,d}(q) = EIRP_{max}(q)/Gb^{max}$. $P_{CMAX,d}(q)$ may be defined in terms of EIRP. The threshold used with $P_{CMAX,d}$ may be half-power bandwidth. The half-power bandwidth may be signaled as part of the WTRU beamforming capability.

A WTRU may determine a total transmission power $P_{x,b}(q)$ for one or more (e.g., all) transmissions, for example, using a beam b, which may be based on one or more example procedures discussed herein. For example, if an angular separation of the first and second transmission beams is less than a second separation threshold, the uplink transmission power may be determined. For example, the uplink transmission power may be determined based on the first transmission and the second transmission having a shared maximum power level parameter. For example, the first transmission may be associated with the first transmission beam, and the second transmission may be associated with the second transmission beam. A WTRU may determine (e.g., for each subset of beams that may be within a spatial separation threshold) a sum of transmission powers (e.g., in linear units) over a subset of beams (e.g., if the angular separation of the transmission beams is less than a separation threshold). A sum of transmission powers may exceed a configured maximum transmission power $P_{CMAX,d}(q)$. A WTRU may scale down a power of at least one transmission (e.g., using at least one of the subset of beams) so that $P_{CMAX,d}(q)$ may not be exceeded. The conducted transmission powers of each transmission may be multiplied by the maximum gain of the corresponding beam before the summation (e.g., where $P_{CMAX,d}(q)$ may be defined in terms of EIRP). Scaling may be applied to certain transmissions (e.g., in a certain order), for example, according to one or more priority rules.

The first transmission and the second transmission may be transmitted using the first transmission beam and second transmission, respectively. The transmitted first and/or second beam may be scaled.

Reduction of $P_{CMAX}$ applicable to a beam caused by EIRP may be used. A configured maximum transmission power $P_{CMAX,b}(q)$ may be defined for transmission over a beam or beam process in a time interval q. A power reduction (e.g., maximum power reduction) due to EIRP may be applied in the time interval if the WTRU is simultaneously transmitting in the time interval q using at least one second beam b'. The amount of reduction may be determined as a function of the gain e.g., $G_b(d)$ and/or $G_{b'}(d)$. For an example, the amount of reduction may be based on coupling parameters $C_{b,b'}$ and $C_{b',b}$. In examples, the amount of reduction may be determined based on the angular separation between the main lobes of b and b'.

A transmission may be capped by $P_{CMAX,b}(q)$. Subsequent scaling may be applied to comply with total radiated power and/or EIRP requirements as described herein.

Resource selection may be power-aware. A WTRU may select a resource for a first transmission, for example, from a set of configured resources provided by physical layer signaling and/or higher layer signaling. A resource may be defined in time, frequency, and/or space (or beam) domain. A first transmission may occur with a second transmission for which resource selection may not apply. For example, the first transmission may occur simultaneously with the second transmission for which resource selection may not apply to a fully scheduled transmission.

In examples, selection of a resource for a first transmission may be based on a resource used for a second transmission. For example, the first transmission may be based on a resource used for the second transmission to attempt to maximize a configured maximum transmission power that may be applicable to the total transmission power of both transmissions. A resource may be selected so that the allocated power for a first transmission may be maximized (e.g., up to its required or desired power), for example, based on the configured maximum transmission power applicable to the total transmission and other configured maximum transmission power parameters that may be applicable to each transmission, e.g., individually.

A second transmission may occupy resources in the frequency domain in accordance with a given allocation. For example, a frequency domain allocation of a first transmission may be selected so as to attempt to maximize the applicable configured maximum transmission power $P_{CMAX,c}(q)$ A frequency domain allocation of the first transmission may be selected minimize a maximum power reduction. A frequency domain allocation of the first transmission may be selected to adjust maximum power reduction. Maximization may be achieved. For example, maximization may be achieved by maximizing a gap between the frequency allocations of multiple (e.g., both) transmissions.

In examples, a second transmission may utilize a certain beam. A beam used for the first transmission may be selected to attempt to maximize its transmission power. For example, the beam used for the first transmission may be selected to attempt to maximize the transmission power up to its required or desired power. The beam may be selected to attempt to maximize the transmission power based on a configured maximum transmission power per direction $P_{CMAX,d}(q)$ and/or other configured maximum transmission power per beam. Selecting a beam used for the first transmission to maximize the transmission power, as described herein, may result in a WTRU selecting a beam for a first transmission whose spatial (or angular) separation with the beam used for a second transmission may be above a threshold, for example, when scaling may be used to satisfy a configured maximum transmission power per direction.

Power prioritization and priority rules applicable to transmissions may use one or more numerologies, beams, and/or waveforms. Scaling may be applied over a set of numerology blocks or transmissions. One or more of the following properties (or criteria) may be used to determine priority order and/or properties used in other systems (such as a type of information carried by a transmission): (i) a numerology parameter applicable to a numerology block or transmission (e.g., scaling may be applied to transmissions using a lower subcarrier spacing, or a larger symbol duration); (ii) duration of a transmission; (iii) a beam index or beam process index (e.g., scaling may be applied last to transmissions associated with a primary beam); (iv) an explicit indication received from downlink control information applicable to a transmission or numerology block; (v) a property associated with a beam (or usage of beam); (vi) waveform used for transmission (e.g., CP-OFDM or SC-FDMA); and/or (vii) type of UL transmission (e.g., scaling may be applied to a transmission performed without an UL grant and/or to a transmission using multiple repetition for higher reliability). For example, scaling may be applied (e.g., last) to transmissions associated with a beam process associated to control transmissions in downlink and/or uplink or scaling may be applied (e.g., last) to transmissions associated with a default beam or fallback beam.

Overall priority between transmissions or numerology blocks may be determined from one or more criterion. In examples, a second or other criterion described herein may be considered, for example, when a value of a first criterion may be the same among transmissions to be prioritized. For example, transmissions may be (e.g., first) prioritized by the information that the transmissions carry (e.g., a type of higher layer data and/or control information) and (e.g., second) by subcarrier spacing. Subcarrier spacing criterion may be considered among transmissions of the same type of higher layer data and/or control information.

A transmission using a first waveform may apply a first set of prioritization based on a first combination of one or more (e.g., all) of the properties described herein, and transmissions using a second waveform may apply a second set of prioritization based on a second combination of one or more (e.g., all) of the properties described herein. The priorities may be defined per waveform and, within each waveform, (e.g., where multiple simultaneous transmissions may occur using multiple different waveforms) the appropriate set of some or all of the above priorities may be used. In other example, the priorities for multiple simultaneous waveform transmissions may be of a third set of prioritization based on a third combination of one or more of the properties described herein. The first, second, and third combination may include one or more of different properties described herein.

UL transmissions may be scheduled in a non-contiguous manner. For example, one or more UL transmissions may be scheduled over sets of non-adjacent PRBs in a non-contiguous manner. A WTRU may be configured with a set of priorities based on one or more (e.g., all) of the properties described herein and/or on whether contiguous or non-contiguous allocation is used.

A non-contiguous allocation may include one or more (e.g., multiple) blocks of contiguous PRBs. A block (e.g., each block) may be defined to have its own priority. In examples, the priority order of the blocks may be preconfigured. In examples, the priority order of the blocks may be indicated to the WTRU. The priority of the blocks may depend on the blocks' location within the carrier. For example, blocks located near the edge of a bandwidth may have different priorities than blocks located near the middle. The priority of the blocks may depend on a frequency domain location within a carrier. For example, a carrier may be divided into one or more regions (e.g., in frequency domain) with different waveform use. Blocks transmitted near the edge of such a region may use lower power to enable appropriate filtering. The block transmitted near the edge may have high priority (e.g., they may be using reduced power). In examples, blocks near the edge may be given low priority (e.g., they may cause an interference).

Power applicable to transmissions associated with a numerology block or beam may be guaranteed. A guaranteed power may be expressed as a ratio of a configured maximum transmission power. A guaranteed power expressed as a ratio of a configured maximum transmission power may be configured for one or more types of transmissions and/or numerology blocks. A guaranteed power may be configured for a subset of transmissions. Scaling down of power for a subset of transmissions may be constrained to not result in decreasing the total power of the subset below a guaranteed power. For example, if a guaranteed power is configured for a certain subset of transmissions, scaling down of power for a subset of transmissions may be constrained to not result in decreasing the total power of the subset below a guaranteed power. A guaranteed power may be applied to subset of transmissions based on, for example, one or more of the following properties: (i) scheduled transmissions or unscheduled transmissions; (ii) transmissions indicated (e.g., explicitly indicated) to be subject to guaranteed power by downlink control information; (iii) transmissions associated with a numerology block (e.g., or using a certain subcarrier spacing); (iv) transmissions associated with a certain beam or beam process (e.g., a beam index, a primary beam, a beam used for control information, a fallback beam, and/or a default beam); (v) transmissions associated to a waveform type; and/or (vi) contiguous or non-contiguous allocation.

A WTRU with multiple simultaneous transmissions using multiple waveforms may be configured with guaranteed minimum power for each set of transmissions for each waveform type. If minimum power for each set of transmissions for each waveform type is ensured, the WTRU may allocate any remaining power in a manner using priority rules as described herein.

Different blocks of PRBs in a non-contiguous allocation may have different guaranteed minimum power. The different guaranteed minimum power of each block may depend on the content of the transmission of a block or the location within the over-all carrier spectrum of a block.

A WTRU may determine the transmission power for a transmission (e.g., or for a portion of a transmission) in a first numerology block as a function of guaranteed powers for a first and second numerology blocks. The first and second numerology blocks may correspond to different TTI durations. The first and second numerology blocks may belong to the same MAC instance.

The guaranteed powers may be determined semi-statically and/or dynamically, for example, based on a field of downlink control information (DCI) signaling the grant applicable to the first transmission. The values may be determined based on whether the transmission overlaps in time with time occasions (e.g., or resources defined in the time domain) configured by higher layers. Time resources may correspond to resources available to certain types of transmission (e.g., higher priority transmissions).

When determining the available transmission power for transmissions of the first numerology block, the WTRU may change the power such that transmissions of the second numerology that may overlap in time with the first transmission (e.g., starting at the same time or later than the first transmission) may be allocated up to the guaranteed power for the second numerology block, according to principles similar to power control mode 2 for dual connectivity. If at least one transmission of the second numerology block starts at the same time as the first transmission and the WTRU can determine that no other transmission from the second numerology block starting later can overlap, the WTRU may determine the power of the first transmission based on the power requirements of the transmission of the second numerology block. The WTRU may take into account the guaranteed power applicable to the first transmission and/or other priority criteria, for example, according to principles similar to power control mode 1 for dual connectivity when, for example, at least one transmission of the second numerology block starts at the same time as the first transmission and the WTRU can determine that no other transmission from the second numerology block starting later can overlap.

The power allocation of a transmission may be allowed to change at certain times. Each interval of time over which power is not allowed to change may be referred to as a portion. In case a transmission of a first numerology block has more than a portion, the determination of power for each portion may be based on transmissions of the second numerology blocks that may overlap in time within the portion. The WTRU may determine guaranteed power values that are dependent on the specific portion of the transmission. The guaranteed power values may be provided by dynamic signaling. The values may be determined based on whether the portion overlaps with time occasions (e.g., or resources defined in the time domain) defined by higher layers.

The guaranteed power for a numerology block may be expressed in terms of a fraction of the configured total maximum power for the WTRU (e.g., $P_{CMAX}$) or of the available power to the MAC in absolute units (e.g., in mW or dBm), at least when the WTRU is configured with a MAC instance.

A WTRU may be configured with two MAC instances. One or more numerology blocks may be associated with each MAC instance. The WTRU may determine the power available to a first MAC instance, based on the transmission powers of on-going transmissions and/or the guaranteed power for a second MAC instance. The WTRU may determine a guaranteed power for each numerology block associated to the first MAC instance as a fraction of the power available to the first MAC instance. The fraction may be signaled using physical layer and/or higher layer signaling as described herein.

Power may be allocated in the presence of unintended receivers (e.g., victim nodes). In examples, receiving nodes may be densely packed in a close geographic proximity. A receiving node may be, for example, a WTRU, a TRP, a relay, and the like. Data transmitted may originate from one or more of WTRUs, TRPs, and/or relays. Flexibility may permit multiple directions of transmissions (e.g., UL, DL, and/or single-link (SL)) to be scheduled simultaneously on overlapping sets of resources.

Interference may be reduced on neighboring receiving nodes. A WTRU may be based on its contribution to that interference and may modify its UL transmission power. This may be applicable, for example, when beamforming may be used, and when a WTRU transmits in a beam direction to its intended receiving node with another receiving node (e.g., a victim node) located along the same beam path.

A WTRU may be configured with a set of parameters that the WTRU may use to modify its UL power control formulas. Parameters that may be used to modify UL power control formulas may include, for example, one or more of the following: (i) total number of victim nodes; (ii) identity of victim node(s); (iii) path loss to victim node(s); (iv) maximum receive interference power at victim node(s); (v) alpha factor; (vi) numerology used at victim node(s); (vii) resources on which to modify UL power; and/or (viii) type of victim node(s).

In examples of a total number of victim nodes, a WTRU's transmission may create interference to a set of nodes, which may be deemed victim nodes. A WTRU may be configured with a number of victim nodes, for example, given that the power formula the WTRU uses may be a function of the total number of victim nodes (e.g., many victims, a single victim, and/or no victim).

In examples of identity of victim node(s), an identity of a node may (e.g., first) enable a WTRU to find resources on which it may make measurements, for example, to determine the value of an item on this list.

In examples of path loss to victim node(s), a WTRU may calculate a path loss to victim node(s). Calculating a pathloss to victim node(s) may involve knowledge of the transmission power of victim node(s), which may be indicated by a serving node, may be broadcast by potential victim nodes, or may be signaled in a dedicated manner from potential victim node(s).

In examples of a maximum receive interference power at victim node(s), a parameter may indicate to a WTRU a maximum interference power that a victim node may be able to operate with.

An alpha factor may indicate, for example, a potential per victim node.

In examples of resources on which to modify UL power, a WTRU may use a first power control formula assuming a number of victim nodes (e.g., many, one, and/or none) for transmission in a first set of resources and may use a second power control formula assuming a different number of victim node (e.g., many, one, and/or none) for transmissions in a second set of resources. Resources may be, for example, one or more of the following: time resources (e.g., subframes, slots, or symbol), frequency resources (e.g., PRBs or subcarriers), spatial resources (e.g., analog or digital beams), non-orthogonal multiple access resources (e.g., spreading sequence or interleaver), and/or the like.

In examples of type of victim node(s), victim nodes may be segregated into types (e.g., WTRUs, TRPs, and/or relays). Other parameters may be affected, for example, depending on the type of victim nodes. For example, the alpha factor of a victim node may take on a different value depending on the victim node type.

One or more of parameters described herein and/or other parameters may be included in a power control formula, such as an example formula presented herein. For example, a WTRU may be transmitting using a numerology (e.g., a single numerology). A WTRU may be configured with a set K victim nodes. A WTRU may determine a PUSCH transmitted power using, for example, Eq. 4:

$$P_{x,i,c}(q) = \min\begin{cases} P_{CMAX,c}(q), \\ \min_{k \in K}(P_{O\_INT,k,c}(q) + \alpha_k \cdot PL_k + \theta_k), \\ 10\log_{10}(M_{x,i,c}(q)) + 10 \cdot \log_{10}(N_{i,c}) + P_{O\_x,i,c}(j) + \\ \alpha_c^*(j) \cdot PL_c + \Delta_{TF,c}(q) + f_c(q) \end{cases} \quad \text{Eq. 4}$$

$P_{O\_INT,k,c}$ may be a maximum interference power allowable at victim node k, and $\theta_k$ may be an offset factor (e.g., similar to one or more combination of $M_{x,i,c}(q)$, $N_{i,c}$, $\Delta_{TF,c}(q)$, and/or $f_c(q)$).

Other equations, such as examples presented herein, may be modified, for example, by including one or more parameters associated with victim nodes in a power control formula, such as described herein. For example, a WTRU may determine a transmitted power using Eq. 5:

$$P_{x,i,c}(q) = \min\begin{cases} P_{CMAX,c}(q), \\ 10\log_{10}(M_{x,i,c}(q)) + 10 \cdot \log_{10}(N_{i,c}) + P_{O\_x,i,c}(j) + \\ \alpha_c^*(j) \cdot PL_c + \Delta_{TF,c}(q) + f_c(q) \end{cases} \quad \text{Eq. 5}$$

In examples, a WTRU may use a different set of parameters (e.g., other than those indicated in formulas presented herein), and the different set of parameters may depend on the presence of one or more victim nodes. For example, the value used for $\alpha_c^*(j)$ in Eq. 5 may depend on the presence of one or more victim nodes. In examples, a power control formula may produce multiple different values depending on the presence victim node(s) (e.g., none, one or more victim nodes).

A WTRU may receive a dynamic indication of one or more (e.g., enhanced) power control formulas, which may, for example, account for the presence of victim nodes. For example, a WTRU may be semi-statically configured with a power control parameter adjustment to use in the presence of a victim node. A dynamic indication may be used to switch or toggle a WTRU between using power control formulas that may assume, for example, multiple, one, or no victim nodes.

One or more parameters to use in a (e.g., an enhanced) power control formula may be determined, for example, by a WTRU. For example, a WTRU may be configured with a set of resources on which the WTRU may make measurements from a number of possible victim nodes. In examples, a WTRU may determine (e.g., determine autonomously) resources on which the WTRU may make measurements from a number of possible victim nodes.

A WTRU may indicate a set of victim nodes to its serving node. A set may be composed of nodes whose measurements may achieve a certain criterion. For example, a WTRU may measure path loss on resources and may select the top n nodes achieving the lowest path loss value. In examples, a WTRU may measure path loss on resources and may select one or more nodes whose path loss may be within a delta value of the path loss to its serving node. In examples, a WTRU may measure activity (e.g., as a function of ratio of presence of a signal transmitted in a resource) and may report a set of n nodes for which the activity may be considered above a threshold.

Dual connectivity may permit multiple (e.g., two) scheduling entities and may not synchronize carrier (e.g., there may be a reference subframe rule for overlapping transmissions). A time domain numerology may differ between base stations, for example, when using DC with NR. A rule in DC may be to define a time domain related reference entity on which power allocation rules may rely on. The longest time domain scheduling entity may be a reference for power control procedures.

In examples, a WTRU may start a power allocation process for overlapping transmission between carriers with a carrier that may hold a reference time entity using, for example, basic allocation rules defined for a carrier followed by lower time based scheduled entities. If a power limitation occurs, a WTRU may consider a priority that may be determined to have been network signaled. For example, the WTRU may consider a priority that may be determined to have been network signaled based on SCS size or the shortest time domain configured scheduling resource.

If a power limited situation occurs, other (e.g., similar) rules described in various (e.g., CA) scenarios may be followed, for example, along with WTRU signaling to a network at a master base station or a configuring master network entity about a power limitation situation (e.g., with similar consequences from the network side).

Power sharing with band-dependent power may be used. For example, power sharing with band-dependent maximum power may be used. There may be a limitation regarding the maximum total transmission power that is dependent on one or more characteristics of the set of transmissions. For example, the allowed maximum total transmission power may be dependent on one or more of a frequency band, a radio access technology (RAT), and/or a waveform type. For example, a maximum total transmission power may be dependent on the frequency band due to differing maximum surface absorption rate (SAR) requirements depending on the band.

When a WTRU performs (e.g., simultaneously performs) transmissions that do not share one or more (e.g., all) the same characteristics, for example transmissions in different frequency bands, one or more of the transmissions may be subject to a limitation. For example, one or more of the transmissions may be subject to a limitation on the maximum total normalized transmission power. The normalized transmission power may be defined as the ratio (e.g., in linear units) between the transmission power and the maximum total transmission power applicable to a set of transmissions having the same characteristics (e.g., on the same frequency band). The maximum total normalized transmission power may be equal to one (1). For example, the maximum total normalized transmission power being equal to one may be represented by the following formula:

$$\sum_b \sum_{i=1}^{N_b} \frac{P_{i,b}}{P_{CMAX,b}} \leq 1$$

In this formula, the parameter b may represent an index over sets of transmissions, where each set may share the same characteristics (e.g., frequency band). The parameter i may represent an index over transmissions within each set. Parameter $N_b$ may represent the number of transmissions in the $b^{th}$ set. Parameter $P_{i,b}$ may represent the transmission power of the ith transmission of the $b^{th}$ set. $P_{CMAX,b}$ may represent a configured maximum total transmission power applicable to transmissions of the $b^{th}$ set. $P_{CMAX,b}$ as configured maximum total transmission power for a b set may include a power reduction related to the specific band, for example due to SAR or MPE (Maximum Power Exposure) safety limit, respectively.

Using a limitation for the maximum total power may ensure that the WTRU satisfies requirements related to surface absorption rate caused by exposure to transmissions in multiple frequency bands.

If a limitation is defined in terms of total normalized transmission power, the determination of power sharing between transmissions (e.g., or of power scaling) may be based on one or more of the following criterion/procedures.

An example technique for determining how power is to be shared (e.g., or how power is to be scaled) between transmissions may utilize a configured guaranteed power for one or more of the transmissions (e.g., for each transmissions). For example, a guaranteed power may be configured for the transmissions of a cell group, numerology block, and/or beam. Guaranteed power may be defined as a ratio (e.g., percentage) of a configured total transmission power. The configured total transmission power may be a function of the cell group, numerology block, and/or beam for which the guaranteed power may be applicable. If the configured total transmission power is a function of the cell group, numerology block, and/or beam for which the guaranteed power is applicable, the guaranteed power may be referred to as a guaranteed normalized power.

Power allocation or power scaling may be performed using normalized power. For example, power allocation or power scaling may be performed using normalized power rather than and/or in addition to using absolute power. For example, normalized power may divide the transmission power by configured total transmission power applicable to the set of transmissions.

Power allocation may be performed with two or more cell groups. For example, power allocation may be performed with two cell groups: a first corresponding to a set of carriers within the 3.5 GHz band and a second corresponding to a set of carriers at around 30 GHz. The configured maximum total power applicable to the first cell group (at 3.5 GHz) may be 23 dBm (or 200 mW), while the configured maximum total power applicable to the second cell group (at 30 GHz) may be 20 dBm (or 100 mW). The guaranteed (e.g., normalized) power may be 30% and 40% for the first and second cell groups, respectively. The WTRU may determine (e.g., a required or desired) transmission power for each transmission of each cell group using, for example, open-loop power control, closed-loop power control, and/or a combination of open-loop and closed loop power control. The WTRU may determine a normalized required transmission power for each transmission by dividing (e.g., in linear units) the required transmission power by the configured maximum total power applicable to the cell group of the transmission. For example, for a transmission requiring 13 dBm (or 20 mW) in the first cell group, the normalized required transmission power may be (20 mW/200 mW)=0.10, while for a transmission requiring 13 dBm (or 20 mW) in the second cell group, the normalized required transmission power would be (20 mW/100 mW)=0.20. Power allocation calculations may be similar to the calculations used for power control mode 1 (or mode 2) for LTE dual connectivity, except that scaling may be applied to the normalized required transmission power values instead of the absolute required transmission power values. The guaranteed normalized powers and the remaining power (e.g., 100% minus the sum of guaranteed powers) may be expressed as a ratio. When calculations are completed, the sum of the scaled normalized transmission power values may not exceed the value one (1). The WTRU may determine the actual scaled transmission power value for a specific transmission by multiplying the scaled normalized transmission power by the configured total transmission power applicable to the cell group of this transmission. For example, if the scaled normalized transmission power is 0.10 for a transmission of the second cell group, the actual scaled transmission power may be (0.10×100 mW)=10 mW or 10 dBm.

A WTRU and a network entity (e.g., gNB) may exchange power control related signaling. A power headroom report (PHR) may be triggered and/or calculated with multiple numerologies.

Uplink transmissions in the time domain for multiplexed numerologies and/or waveforms may or may not overlap, for example, depending on configuration and/or multiplexing transmission state of the uplink transmissions.

One or more types of PHR may be defined, for example, when multiple numerologies and/or waveforms are multiplexed. For example, a type of PHR may be defined for a specific numerology and/or waveforms and may be computed as a difference between $P_{CMAX,c}(q)$ and $P_{x,i,c}(q)$ allocated power during transmission time q.

A virtual PHR may be computed (e.g., when a WTRU supports unscheduled transmissions that are not ongoing), for example, by subtracting from $P_{CMAX,c}(q)$ (e.g., computed with coexistence related back offs set to zero) a virtual power allocation $P_{x,i,c}(q)$ by an unscheduled but reserved grant.

A power headroom report (PHR) for a numerology and/or waveforms may take into consideration a power reservation ratio (e.g., when signaled or determined), for example, by calculating its power headroom against its reserved power ratio.

An example type of PHR may be a composite. A composite PHR may be based on one or more (e.g., all) ongoing transmissions. A composite PHR may include, for example, one or more of the following: (i) an individual numerology and/or waveforms related PHR for real transmissions; (ii) a combination of a real transmission PHR combined with a virtual transmission for unscheduled ones on another numerology and/or waveforms; and/or (iii) a virtual PHR for different numerologies and/or waveforms (e.g., when no real transmissions occurred in a past specific defined time interval duration).

A PHR may take into consideration whether contiguous or non-contiguous allocations are expected. If a PHR expects a non-contiguous allocation, a WTRU may be configured to use different MPR values per non-contiguous block (e.g., depending on the location within the over-all carrier spectrum of each block). The PHR type may segment the spectrum into one or more different regions (e.g., each with an assumed MPR value) and may lead to reporting a different PHR per region. The PHR may include values for different combinations of non-contiguous blocks. For example, for transmissions assuming blocks at one edge of the spectrum and at the center, the WTRU may report a first PHR value. For transmissions at both edges of the spectrum, the WTRU may report a second PHR value.

A PHR may be transmitted by the WTRU to the based station for assisting with scheduling. A PHR may be periodically scheduled or triggered, for example, by a change in one or more parameters, such as one or more of the following: (i) a path loss change beyond a threshold to the best serving TRP; (ii) a change in TRP serving set (e.g., a collection of TRPs that a WTRU may be actively communicating with); (iii) output power management reductions (P-MPR) or (e.g., sudden) changes of uplink power transmissions (e.g., NR may support unscheduled transmissions); (iv) dual connectivity (e.g., when an unscheduled transmission starts one carrier and the other scheduling entity may be configured to be aware of power reductions); and/or (v) a change of waveforms (e.g., a WTRU may be indicated or determined autonomously when to change waveforms and/or an event may trigger a PHR for one or more of the new waveform type and/or for one or more (e.g., all) possible waveform types).

A limited power situation may be signaled, for example, when power reservation is used. A power reservation for a specific carrier or numerology may cause limited power. A WTRU may determine that there may be a priority hierarchy between numerologies (e.g., carriers). A WTRU may signal the power limitation to the network. For example, a WTRU may set a bit flag that may be specific to a numerology or carrier. A WTRU may send a PHR with a zero or negative power headroom indication or a MAC indication. A WTRU may trigger a RRC event. A network may signal a new power reservation ratio. For example, a network may signal a new power reservation ration upon reception of an indication from a WTRU. A network may perform a resource allocation reconfiguration. A network may adapt uplink scheduling grants to available resources. A may trigger a handover preparation.

Systems, methods, and instrumentalities have been disclosed for uplink power control, e.g., for New Radio (NR). A WTRU may perform power control for uplink transmissions with multiplexed numerologies, beamforming, and/or related signaling. For example, WTRU may determine a transmission power based on one or more of power allocation rules, priorities, dependency on numerology, multiplexed numerologies, interference (e.g., victim nodes), beamforming, and/or uplink power control related signaling. Power allocation may be dependent on numerology. Power allocation with multiple numerologies may consider a maximum DAC dynamic range and/or a maximum configured power. Power applicable to transmissions may be guaranteed. Power allocation for transmission may use multiple beams with $P_{CMAX}$ configured per direction. Resource selection may be power-aware. Priority rules may be applicable to transmissions using multiple numerologies and/or beams. Power may be allocated based on the presence of unintended receivers (e.g., victim nodes). Power headroom reports may be triggered and/or calculated with multiple numerologies. Power limitations may be signaled with multiplexed numerologies.

The processes and instrumentalities described herein may apply in any combination, may apply to other wireless technologies, and for other services.

A WTRU may refer to an identity of the physical device, or to the user's identity such as subscription related identities, e.g., mobile station international subscriber directory number (MSISDN), session initiation protocol (SIP) uniform resource identifier (URI), etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method implemented in a wireless transmit/receive unit (WTRU), the method comprising:
   receiving configuration information related to a set of physical resource blocks, wherein each physical resource block of the set of physical resource blocks is associated with a same numerology;
   determining, based on the configuration information, a set of power control parameters and a respective subcarrier spacing associated with the set of physical resource blocks;
   determining a transmission power for the set of physical resource blocks using the set of power control parameters and a determined power allocation value, wherein the determined power allocation value corresponds to a ratio between a first value of the respective subcarrier spacing and a second value of a reference subcarrier spacing, and wherein the transmission power for the set of physical resource blocks is determined based on a logarithm of a value, the value being determined based on at least the determined power allocation value; and transmitting the set of physical resource blocks using the determined transmission power.

2. The method of claim 1, wherein the transmission power for the set of physical resource blocks is adjusted using a scaling factor in the determined power allocation value.

3. The method of claim 1, further comprising determining a scaling factor in the determined power allocation value, wherein the scaling factor is a multiplicative factor, an offset value, or the ratio between the first value of the respective subcarrier spacing associated with the set of physical resource blocks and the second value of the reference subcarrier spacing.

4. The method of claim 3, wherein the first value of the reference subcarrier spacing is 15 kHz, and the first value of the respective subcarrier spacing is a multiplication of the second value of the reference subcarrier spacing.

5. A wireless transmit/receive unit (WTRU) for wireless communications, the WTRU comprising:
 a receiver configured to receive configuration information related to a set of physical resource blocks, wherein each physical resource block of the set of physical resource blocks is associated with a same numerology;
 a processor configured to:
 determine, based on the configuration information, a set of power control parameters and a respective subcarrier spacing associated with the set of physical resource blocks;
 determine a transmission power for the set of physical resource blocks using the set of power control parameters and a determined power allocation value, wherein the determined power allocation value corresponds to a ratio between a first value of the respective subcarrier spacing, and a second value of a reference subcarrier spacing, and wherein the transmission power for the set of physical resource blocks is determined based on a logarithm of a value, the value being determined based on at least the determined power allocation value; and
 a transmitter configured to transmit the set of physical resource blocks using the determined transmission power.

6. The WTRU of claim 5, wherein the processor is further configured to adjust the transmission power for the set of physical resource blocks using a scaling factor in the determined power allocation value.

7. The WTRU of claim 5, wherein the processor is further configured to determine a scaling factor in the determined power allocation value, wherein the scaling factor is a multiplicative factor, an offset value, or the ratio between the first value of the respective subcarrier spacing associated with the set of physical resource blocks and the second value of the reference subcarrier spacing.

8. The WTRU of claim 7, wherein the first value of the reference subcarrier spacing is 15 kHz, and the first value of the respective subcarrier spacing is a multiplication of the second value of the reference subcarrier spacing.

9. The WTRU of claim 5, wherein the second value of the reference subcarrier spacing is 15 kHz.

10. The WTRU of claim 9, wherein the first value of the respective subcarrier spacing is 30 kHz, and the determined power allocation value is two.

11. The WTRU of claim 9, wherein the first value of the respective subcarrier spacing is 60 kHz, and the determined power allocation value is four.

12. The method of claim 1, wherein the second value of the reference subcarrier spacing is 15 kHz.

13. The method of claim 12, wherein the first value of the respective subcarrier spacing is 30 kHz, and the determined power allocation value is two.

14. The method of claim 12, wherein the first value of the respective subcarrier spacing is 60 kHz, and the determined power allocation value is four.

* * * * *